(12) United States Patent
Mondo et al.

(10) Patent No.: US 12,128,598 B2
(45) Date of Patent: Oct. 29, 2024

(54) METHOD AND APPARATUS FOR FORMING A GEOMEMBRANE WITH BENT SPIKES (71) Applicant: AGRU/AMERICA, Inc., Georgetown, SC (US)

(72) Inventors: Michael Lee Mondo, Georgetown, SC (US); Drew Sherman, Murrells Inlet, SC (US)

( * ) Notice: Subject to any disclaimer, the term of this patent is extended or adjusted under 35 U.S.C. 154(b) by 148 days.

(21) Appl. No.: 18/079,705

(22) Filed: Dec. 12, 2022

(65) Prior Publication Data

US 2024/0190059 A1 Jun. 13, 2024

(51) Int. Cl.
*B29C 48/00* (2019.01)
*B29C 48/08* (2019.01)
*B29C 48/88* (2019.01)

(52) U.S. Cl.
CPC .......... *B29C 48/0022* (2019.02); *B29C 48/08* (2019.02); *B29C 48/914* (2019.02)

(58) Field of Classification Search
CPC ........ B29C 48/002; B29C 48/07; B29C 48/08
See application file for complete search history.

(56) References Cited

U.S. PATENT DOCUMENTS

| | | | |
|---|---|---|---|
| 5,167,895 A | 12/1992 | Lueghamer | |
| 6,132,845 A | 10/2000 | Heinzlreiter | |
| 7,001,111 B2 * | 2/2006 | Maxwell | E02B 3/122 405/15 |
| 2012/0034039 A1 * | 2/2012 | Hawkins-Maxwell | B29C 48/0019 156/219 |
| 2020/0071887 A1 | 3/2020 | Lewis et al. | |
| 2022/0049450 A1 | 2/2022 | Lewis et al. | |

* cited by examiner

*Primary Examiner* — Thu Khanh T. Nguyen
(74) *Attorney, Agent, or Firm* — Gerald E. Hespos; Michael J Porco (57) ABSTRACT

A system and method are provided for forming a geomembrane. The system includes an extrusion station having a flat extrusion die for producing a resin sheet with opposite first and second flat surfaces. A spike forming station is downstream of the extrusion station in a sheet feeding direction and has first and second chill rollers for respectively contacting the first and second flat surfaces of the sheet. The second chill roller has cavities and the resin flows into the cavities to form spikes. A spike bending station is downstream from the spike forming station and has a nonrotating curved surface that applies pressure to projecting ends of the spikes to bend the spikes in a direction opposite to the sheet feeding direction.

18 Claims, 8 Drawing Sheets

METHOD AND APPARATUS FOR FORMING A GEOMEMBRANE WITH BENT SPIKES

BACKGROUND

1. Field of the Invention

The invention relates to a method and apparatus for forming a geomembrane with spikes projecting unitarily from at least one surface of the geomembrane so that the spikes have a non-perpendicular and/or bent alignment relative to the surface of the geomembrane from which the spikes extend.

2. Description of the Related Art

The disposal of waste material presents challenges to environmental engineers, landfill operators, and manufacturers of goods. In particular, waste materials must be stored and/or disposed of in a manner that protects the environment from contamination.

Many waste products can be treated to negate their environmental impact. Other waste materials cannot be treated immediately and must be held for a period of time in a holding area. Such holding areas include landfills for household trash, landfills for hazardous waste, mining leach pads and coal residual storage locations to name a few. These holding locations or landfills typically are lined with and/or covered by a sheet material that often is referred to as a geomembrane. The liner or geomembrane typically is formed from at least one resin material (e.g. HDPE, LLDPE, PP, but not limited to these resin types) that covers the landfill site. The waste material then is deposited on the geomembrane to prevent the waste material from leaching into the underlying soil and potentially contaminating ground water.

Many waste materials degrade over time and generate methane gas. Moisture, such as rain, can accelerate the rate of methane production from the waste material. As a result, many landfill sites position geomembranes over the landfill to contain the methane that is produced and to keep the waste material relatively dry so that the methane production rate is relatively low. The upper geomembrane or cap also prevents the deposited waste material from being transported by wind or rain to locations that are not protected adequately by the geomembrane upon which the waste material is deposited.

Waste materials typically are added to the landfill periodically over an extended time. As a result, the uppermost geomembrane layer or cap may have to be pulled back from the waste material so that additional deposits of the waste material can be made. This upper layer of the geomembrane then is moved back into its covering and protective position.

At least part of the upper surface of a landfill is likely to be sloped, and the geomembrane that covers the upper surface of the landfill will conform to and follow this sloped upper surface of the waste material. Gravitational forces applied to the geomembrane can cause the geomembrane to slip gravitationally down along the sloped surface, thereby permitting unimpeded emission of methane gas and leaving upper regions of the deposited waste material exposed and subject to being moved by wind or rain to unprotected locations. Movement of the geomembrane also can be caused by movement of the ground due to periodic freezing and thawing, seismic movement of the earth and/or forces generated by nearby equipment, such as transportation vehicles that periodically deliver or remove material from the landfill site. Movement of the geomembrane along the sloped surface of the landfill can be impeded by roughening the lower surface of the geomembrane or by forming projections on the lower surface of the geomembrane. These projections or roughened regions are intended to bite into the upper surface of the waste material that has been deposited at the landfill site for purposes of preventing sliding movement of the geomembrane along the upper surface.

Projections or roughened regions on a surface of the geomembrane are formed by passing the geomembrane against a calender roll with recesses that correspond to the shape and location of the projections that are desired to be formed on the geomembrane. The recesses in the calender rolls also must be formed with a shape that permits the formed projections to be separated easily from the recess as the geomembrane moves away from the calender roll. As a result, the recesses taper uniformly and extend radially in from adjacent surfaces of the calender roll. Accordingly, the projections generally are substantially symmetrical at farther distances from the surface of the geomembrane from which the projections extend and typically project perpendicularly from the surface of the resin sheet adjacent to the projections.

Some deposited waste materials, such as fine powders, are not capable of gripping projections of the geomembrane. In these situations, a multilayer geomembrane system may be employed. For example, one or more porous sheets may be applied over the waste material and a geomembrane with conical projections may be applied over the porous sheet. The conical projections will engage in pores of the porous sheet in a manner that prevents or restricts sliding movement between the geomembrane and the porous sheet.

Managers and operators of landfill sites have become increasingly concerned that wind can dislodge geomembranes, particularly along the edges of the geomembrane. The roughening or symmetrically tapering projections on the lower surface of the geomembrane may provide adequate resistance to shifting of the geomembrane along the sloped upper surface of some deposited waste material but provide much less resistance to wind related lifting of the geomembrane. Bent or curved projections have been considered recently for preventing wind-related dislodgment of geomembranes (e.g. US2020/0071887 and US2022/0049450). However, the known art does not teach efficient methods or apparatus suitable for making geomembranes with non-perpendicular or non-symmetrical projections. For example, U.S. Pat. Nos. 5,167,895 and 6,132,845 show a resin sheet material with non-perpendicular or non-symmetrical projections and a calender roll for making those projections. The sheet material disclosed in U.S. Pat. Nos. 5,167,895 and 6,132,845 is well-suited for lining concrete receptacles where the concrete is poured to surround the uniquely configured projections. The concrete then is cured and hardens around the projections. Although the projections taught by U.S. Pat. Nos. 5,167,895 and 6,132,845 can be formed during a calendering process, the shapes of these projections are not well suited for gripping another sheet that already is in place.

In view of the above, an object of the invention to provide an system and method for making a geomembrane with bent or curved projections that are suitable for engaging an adjacent sheet of porous material to restrict separation of the spikes from the adjacent sheet.

SUMMARY OF THE INVENTION

A first aspect of the invention relates to a system of apparatuses for forming a geomembrane or liner that is particularly suitable for covering a landfill site and that is resistant to transverse forces, such as those produced by wind. The system defines an extrusion line with opposite upstream and downstream ends and stations spaced from one another between the upstream and downstream ends.

An extrusion station is at the upstream end of the line and has a flat extrusion die that is configured to extrude a resin sheet toward the downstream end of the line. The extrusion die is configured to produce an extruded sheet that has opposite first and second planar surfaces. Additionally, the extrusion die may be configured to extrude a resin such as low density polyethylene, a medium density polyethylene, a high density polyethylene or polypropylene. The extruded sheet of some embodiments has a thickness in a range of 0.6 mm to 2.5 mm and a width of several meters (e.g. 6 meters).

A spike forming station is downstream of the extrusion station in a feed direction of the resin sheet. The spike forming station of some embodiments includes first and second opposed chill rollers extending substantially parallel to one another and transverse to the feed direction of the resin sheet from the extrusion die. The chill rollers are disposed to define a nip that is positioned to receive the flat sheet extruded from the extrusion die. The first chill roller contacts the first planar surface of the extruded sheet and the second chill roller contacts the second planar surface of the extruded sheet. Cavities extend into the second chill roller in a radial direction. The cavities are configured to narrow at farther radial distances inward from the outer circumferential surface of the second chill roller. For example, each of the cavities may define a conical recess that may be formed by drilling, machining or molding. The conical cavities of some embodiments will have a depth in a range of 3 mm to 8 mm, and conical cavities with a depth of 5.5 mm have been found to be particularly effective. The first chill roller of some embodiments may be smooth. However, the first chill roller may have cavities that may be configured differently from the cavities in the second chill roller. For example, the cavities in the first chill roller may define shallow grooves or shallow truncated cones.

The first and second chill rollers exert pressure on the respective first and second surfaces of the resin sheet at a time when the resin of the resin sheet is not fully solidified. As a result, forces exerted by the chill rollers on the resin that moves through the nip between the chill rollers urges the resin into the cavities in the second chill roller and also into any cavities that may be present in the first chill roller. Rotation of the chill rollers causes the resin sheet to move in a downstream direction along the line and also causes the cavities in the second chill roller to rotate away from the resin on the downstream side of the nip between the chill rollers. Thus, the resin that had been in the cavities defines spikes that project from the second surface of the resin sheet. The spikes of some embodiments are substantially conical and project substantially perpendicularly from a plane defined by the resin sheet as the resin sheet separates from the nip between the chill rollers. The spikes on the second surface of the sheet may have other non-conical shapes, such as pyramidal shapes. Embodiments that have recesses in the first chill roller will form truncated projections or a general roughening on the first surface of the sheet as the sheet moves downstream from the nip between the chill rollers. However, the spikes projecting from the second surface in most embodiments will have a projecting height several times greater than a projecting height of any projections that may be provided on the first surface.

A spike bending station is downstream of the spike forming station in the sheet feeding direction. The spike bending station of some embodiments includes a spike bending station roller opposed to the first surface of the resin sheet. The spike bending station roller of some embodiments may be driven rotatably and applies sufficient force to the resin sheet for advancing the resin sheet downstream and in the sheet feeding direction. However, the spike bending station roller of other embodiments is idle, and downstream force on the resin sheet may be applied by rollers downstream of the spike bending station. The spike bending station further includes a convexly curved spike bending support opposed to the second surface of the resin sheet and in a position to contact at least projecting ends of the spikes. The convexly curved spike bending support of some embodiments is non-rotatable. Contact of the non-rotatable spike bending support with the spikes causes the spikes on the second surface of the resin sheet to bend toward the upstream end of the resin sheet and hence in a direction opposite to the sheet feeding direction. The non-rotatable spike bending support may be a hollow rigid tube formed from metal. However, the non-rotatable spike bending support may be made of plastic and may exhibit some resiliency. Additionally, the spike bending support may be mounted adjustably to permit a controlled movement of the non-rotatable spike bending support toward and away from the resin sheet. This movement of the non-rotatable spike bending support permits controlled adjustments to the force applied by the spike bending support to the spikes. Additionally, movement of the non-rotatable spike bending support is carried out to accommodate resin sheets of different thicknesses, as determined by the extrusion die and/or by the nip between the first and second chill rollers at the spike forming station.

The convexly curved spike bending support of some embodiments is rotatable, thereby defining a spike bending roller. The speed of the outer surface of the rotatable spike bending roller will affect the amount and direction of the bend. For example, a spike bending roller that is driven rotatably at a speed faster than the line speed can create a reverse bending angle. The spike bending roller can be made of hard rubber or other high friction material to grab the spike and bend the spike downstream by having the spike bending roller move faster than the line speed. Furthermore, the spike bending roller can be programmed to change speed from faster than the line speed to slower than the line speed to vary the amount and direction of the bend between an upstream bend and a downstream bend. Still further, the spike bending station can have plural spike bending rollers arranged at different positions in a direction perpendicular to the sheet feeding direction. These plural spike bending rollers can rotate at different speeds and/or different directions. Thus, the resin sheet can have some spikes bent in an upstream direction and other spikes bent in a downstream direction.

Embodiments of the extrusion line that form projections on the first surface of the resin sheet may have no spike bending station roller or may have a spike bending station roller that is configured to contact only areas of the first surface of the resin sheet that have no projections, such as opposite side edge regions. Embodiments that have no spike bending station roller will have downstream apparatus to maintain sufficient tension on the resin sheet to cause the spikes on the second surface of the resin sheet to bend as the second surface of the resin sheet moves across the non-rotatable spike bending support or across a spike bending roller.

The resin sheet with the bent spikes continues downstream from the spike bending station to a sheet rolling station where the sheet is wound onto a spindle for delivery to a warehouse or an installation site. The sheet rolling station may be configured to apply or maintain tension on the resin sheet as upstream parts of the resin sheet move through the spike bending station.

Another aspect of the invention relates to a method for forming a geomembrane. The method includes extruding a resin sheet from an extrusion die so that the resin sheet has opposite first and second planar surfaces.

The method proceeds by advancing the resin sheet to a spike forming station. More particularly, the resin sheet is urged through a nip between first and second chill rollers that are dimensioned and disposed to exert forces respectively on the first and second planar surfaces of the resin sheet. The first chill roller may have a smooth cylindrical outer surface, but the second chill roller has cavities extending radially inward. The cavities of some embodiments of the second chill roller are conical or pyramidal. As a result, forces exerted by the first and second chill rollers cause the resin adjacent the second planar surface of the resin sheet to be urged into the cavities or recesses formed in the second chill roller. Some embodiments of the first chill roller also may have cavities. Cavities that may be present in the first chill roller may be shallower than the cavities in the second chill roller and, for example, may form grooves or truncated conical recesses.

The method continually rotates the first and second chill rollers and thereby separates the cavities in the second chill roller from the resin of the sheet and leaves resin spikes extending perpendicularly from the second surface of the resin sheet. Projections, such as truncated cones or general roughening, may be formed on the first surface of the resin sheet in some embodiments of the method The method proceeds by advancing the resin sheet downstream from the chill rollers and causes the spikes to be urged against a non-rotatable convexly curved support or against a spike bending roller. The movement of the resin sheet across the non-rotatable convexly curved support deforms the spikes in an upstream direction and opposite to the sheet feeding direction. A movement of the resin sheet across a rotatable spike bending roller deforms the spikes in an upstream direction or in a downstream direction depending upon whether the spike bending roller is driven or idle and in accordance with a speed of the spike bending roller relative to the travel speed of the sheet. Thus, the resin sheet forms a geomembrane with a plurality of spikes, all of which may be bent in a common direction.

The geomembrane can be wound into a roll after sufficient curing of the resin. The wound roll of the geomembrane subsequently can be delivered to an installation site. The spikes that are bent in the common direction can be hooked into a porous underlayer of a geomembrane system to resist wind forces that might otherwise dislodge the geomembrane and expose deposited waste material.

DETAILED DESCRIPTION

Figure 1:
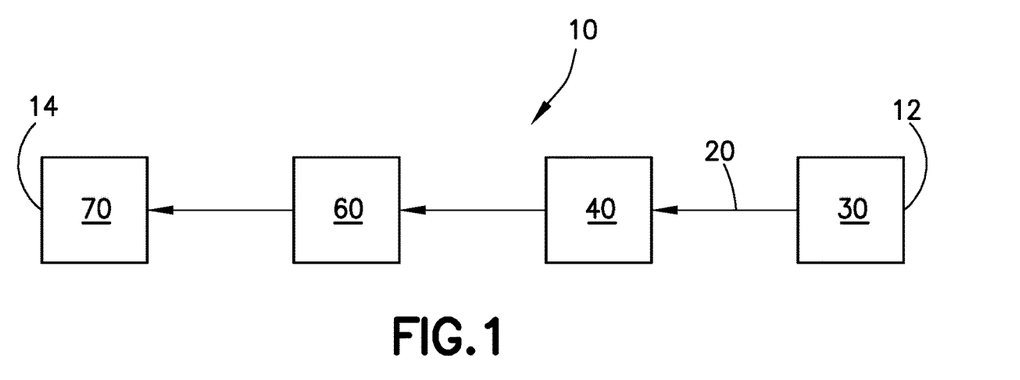
FIG. 1 is a schematic view of an extrusion line for forming a geomembrane with bent spikes in accordance with an embodiment of the invention.

A system in accordance with an embodiment of the invention is identified generally by the 10 in FIG. 1. The system 10 may be referred to as an extrusion line and comprises a plurality of apparatuses arranged from an upstream end 12 to a downstream end 14 that are spaced apart along a feed direction 16. The system 10 is operative to produce a resin sheet 20. More particularly, the system 10 includes an extrusion station 30 at the upstream end 12, a spike forming station 40 downstream of the extrusion station 30, a spike bending station 60 at the downstream and 14 of the system 10 and a sheet rolling station 70 downstream of the spike bending station 60. The various stations 30, 40, 60 and 70 of the system 10 are described in further detail below.

Figure 2:
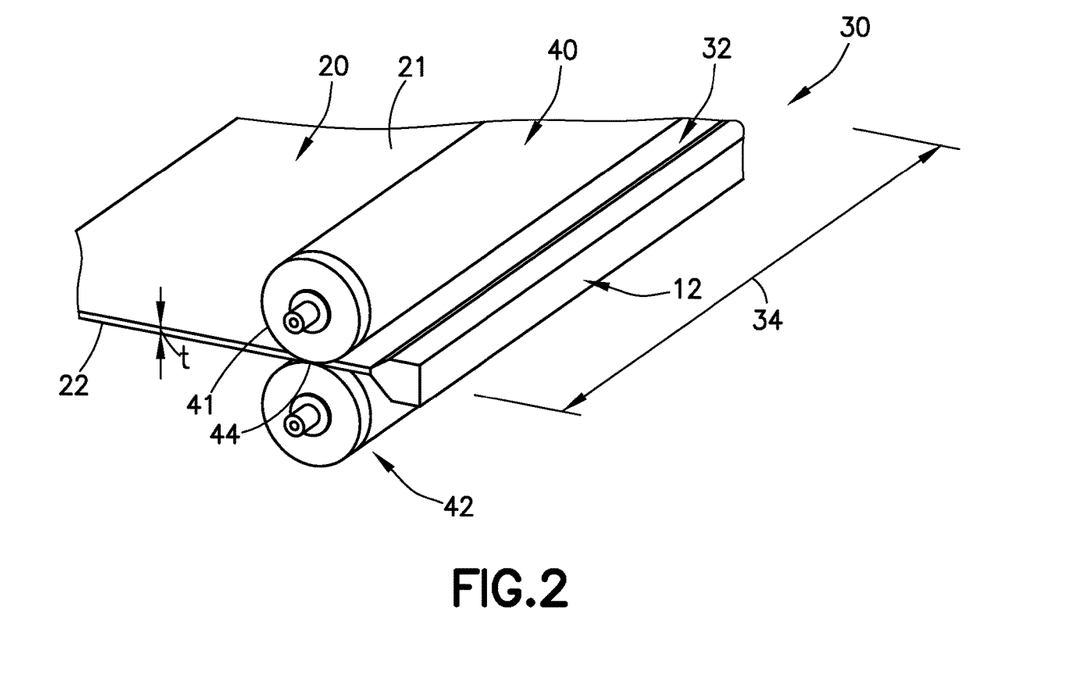
FIG. 2 is a perspective view of a first embodiment of an extrusion station at an upstream end of the extrusion line illustrated schematically in FIG. 1 and a spike forming station downstream of the extrusion station in a sheet feeding direction.

The extrusion station 30 includes a flat extrusion die 32 having a width 34 extending transverse to the feed direction 16. The width 34 of the extrusion die 32 will be a function of the required width of the geomembrane sheet 20 that will be made by the system 10. In some instances, the width of the geomembrane sheet 20 will be about 6 meters, and hence the extrusion die 32 will have a width 34 of approximately 6 meters. In other instances, the width 34 of the extrusion die will be some fraction (e.g. ½ or ⅓) of the required width of the geomembrane sheet 20, and a plurality of narrower sheets 20 will be extruded by the flat extrusion die 32 and welded together with edge regions being overlapped. The flat extrusion die 32 produces a resin sheet 20 having a thickness that typically will be in a range of 0.6 mm-2.5 mm. The resin sheet 20 that is extruded from the flat extrusion die 32 will be substantially flat and will have opposite first and second surfaces 21 and 22 that are substantially flat or planar.

Figure 3:
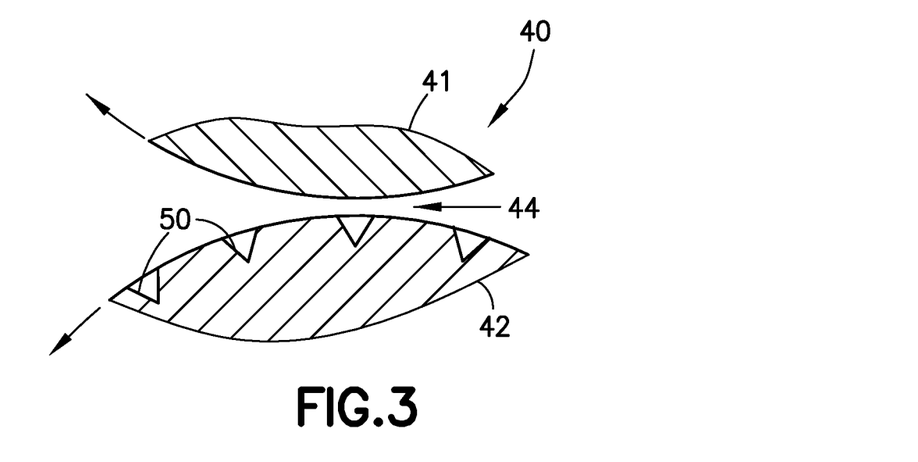
FIG. 3 is a cross-sectional view of a portion of opposed first and second chill rollers at the spike-forming station.
Figure 4:
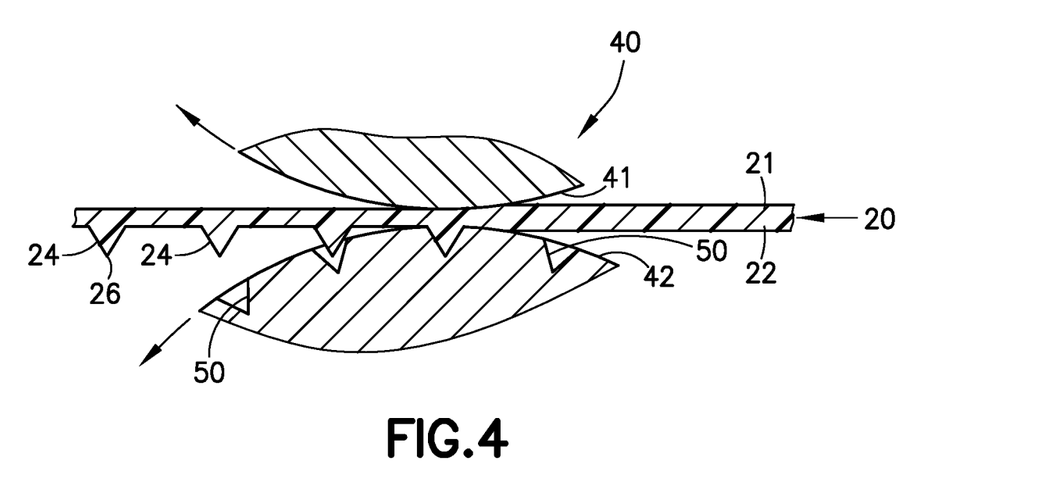
FIG. 4 is a cross-sectional view similar to FIG. 3, but showing the resin at the second surface of the resin sheet that has been caused to flow into the recesses in the second chill roller.

The spike forming station 40 is downstream of the extrusion station 30 and includes first and second chill rollers 41 and 42 with a nip 44 formed between the first and second chill rollers 41 and 42. The resin sheet 20 that is extruded by the flat extrusion die 32 is fed into the nip 44 between the first and second chill rollers 41 and 42 so that the first chill roller 41 is opposed to the first surface 21 of the extruded sheet 20, and the second chill roller 42 is opposed to the second surface 22 of the extruded sheet 20. The first chill roller 41 of this embodiment has a smooth cylindrical surface 46. The second chill roller 42 also has an outer surface 48 that is smooth and cylindrical across a major part of the outer surface 48. However, the outer surface 48 of the second chill roller 42 is characterized by cavities 50. Each cavity 50 in the illustrated embodiment is symmetrical about a radiantly aligned axis of the respective cavity. In the illustrated embodiment, each cavity 50 is conically generated. However, cavities with other shapes are possible, including a pyramidal cavities or other shapes that taper to narrower cross-sectional dimensions at radially increased depths d. The dimensions of the nip 43 between the first and second chill rollers 41 and 42 is established to cause the resin adjacent the second surface 22 of the extruded sheet 20 to be forced into the cavities 50 in the second chill roller 42, as shown in FIG. 4. Continued rotation of the first and second chill rollers 41 and 42 causes the cavities 50 of the second chill roller 42 to separate from the extruded sheet 20, thereby leaving spikes 24 projecting at spaced apart positions from the second surface 22 of the sheet 20, as shown in FIG. 4. Each spike 24 will extend substantially perpendicularly from the second surface 22 and will terminate at a well-defined point 26. In one embodiment, each spike 24 will project approximately 0.225 inch and the spikes 124 will be spaced from one another by about 1.0 inch.

Figure 5:
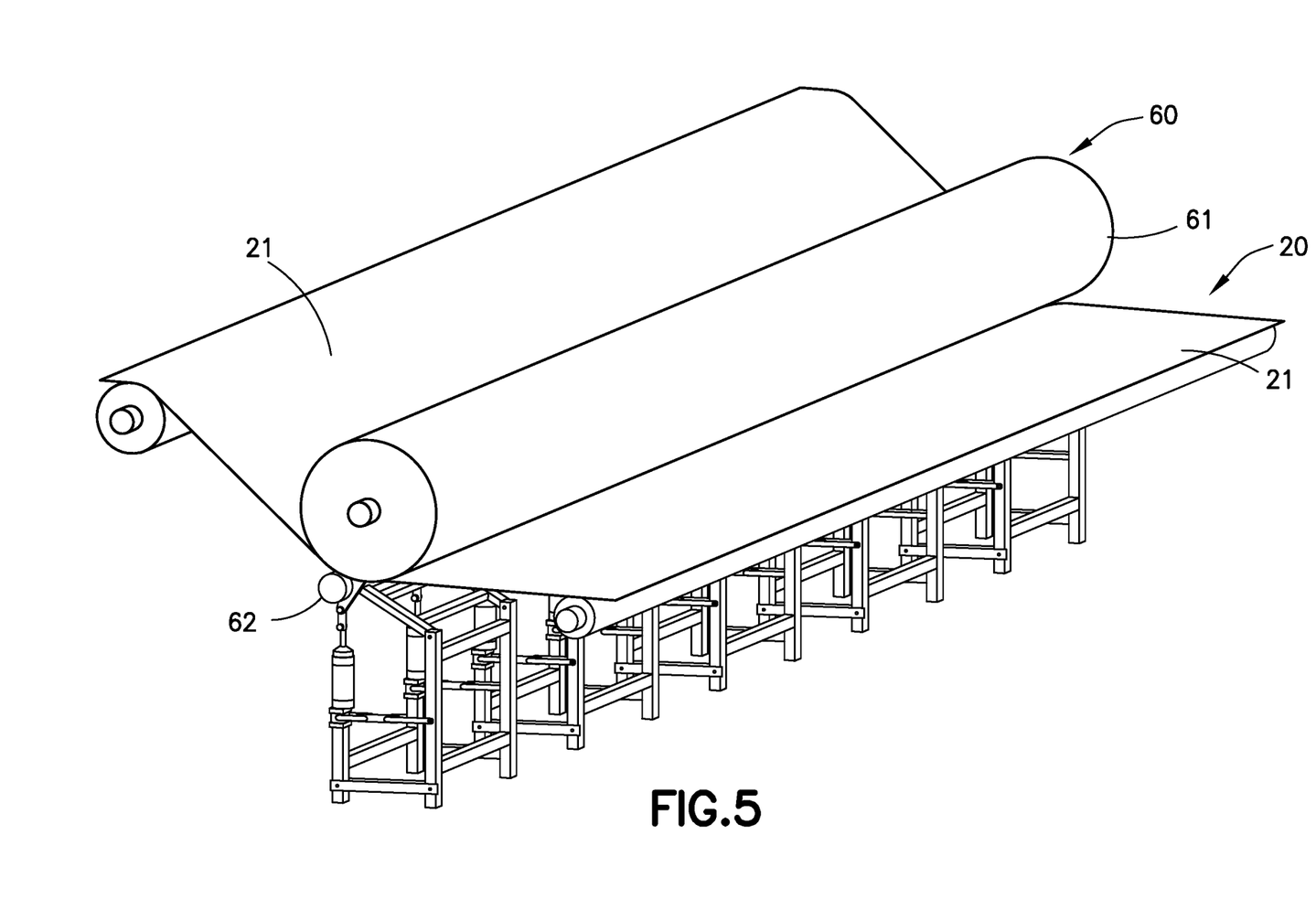
FIG. 5 is a perspective view of a spike-bending station downstream of the spike-forming station of the extrusion line illustrated schematically in FIG. 1.
Figure 6A:
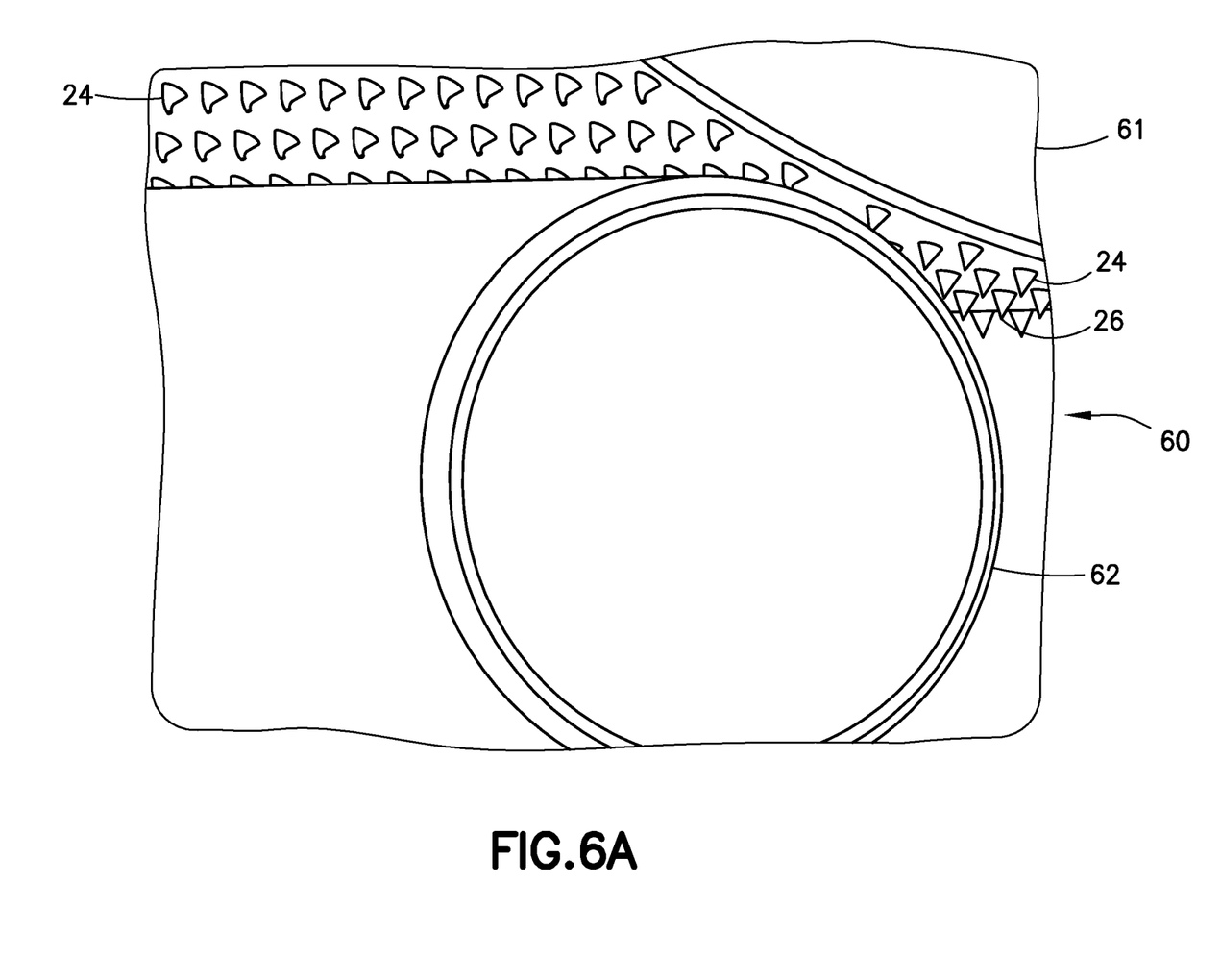
FIG. 6A is an enlarged perspective view of the spike bending station showing spikes that have not yet been bent and spike that already have been bent.
Figure 7:
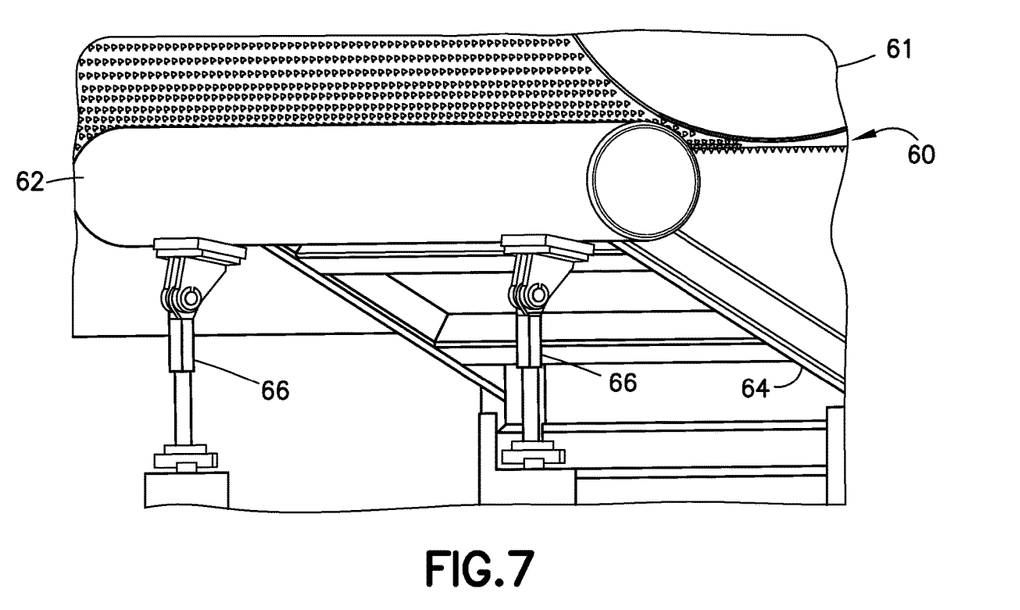
FIG. 7 is a perspective view of the spike bending station and illustrates an embodiment of adjusting mechanisms for moving a non-rotatable convexly curved support transverse to a feeding direction of the resin sheet to accommodate different thickness of the resin sheet and/or to adjust a bending force applied to the spikes.
Figure 8:
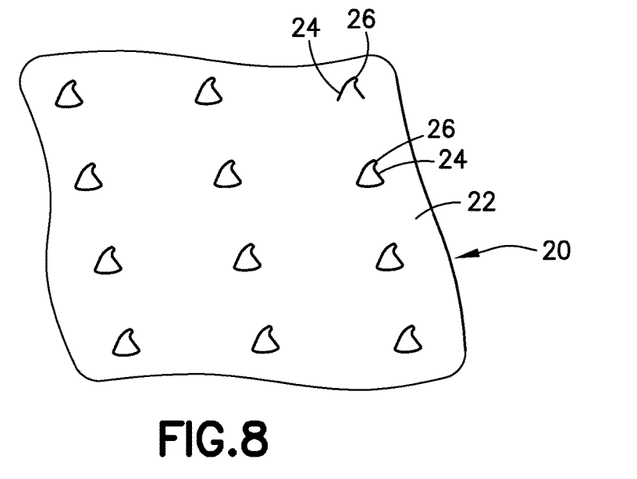
FIG. 8 is a perspective view of the resin sheet with the bent spikes.

The spike bending station 60 is downstream of the spike forming station 40 in the sheet feeding direction and includes a rotatably driven roller 61 opposed to the flat first surface 21 of the sheet 20 and a non-rotatable convexly curved support 62a opposed to the second surface 22 of the sheet 20, as shown FIGS. 5, 6A and 7. The non-rotatable convexly curved support 62a is mounted to swivel arms 64 that can pivot about an axis that extends parallel to the width direction 34. Additionally, the non-rotatable convexly curved support 62a is engaged with or mounted to air cylinders 66 at spaced apart positions along the width direction 34. The air cylinders 66 are operative to pivot the swivel arms 64 and to move the non-rotatable curved support 62a selectively toward or away from the outer surface of the rotatably driven roller 61 at the spike bending station 60 for adjusting the dimension of the nip between the roller 61 and the non-rotatable curved support 62. The non-rotatable curved support 62a is positioned to contact at least the well-defined points 26 of the spikes 24 as the sheet 20 is fed in the feed direction 16 toward the downstream end 14. The contact of the non-rotatable curved support 62a with the projecting end regions of the spikes 24 at or near the well-defined points 26 will cause the spikes 24 to bend opposite to the sheet feeding direction 16 and toward the upstream end 12 at a time before the resin of the sheet 20 cures and hardens. The spikes 24 will retain the shape bent toward the upstream end 12 as the resin cures, thereby defining a uniform array of spikes 24 all permanently bent in the same direction toward the upstream end 12 of the system 10.

Figure 6B:
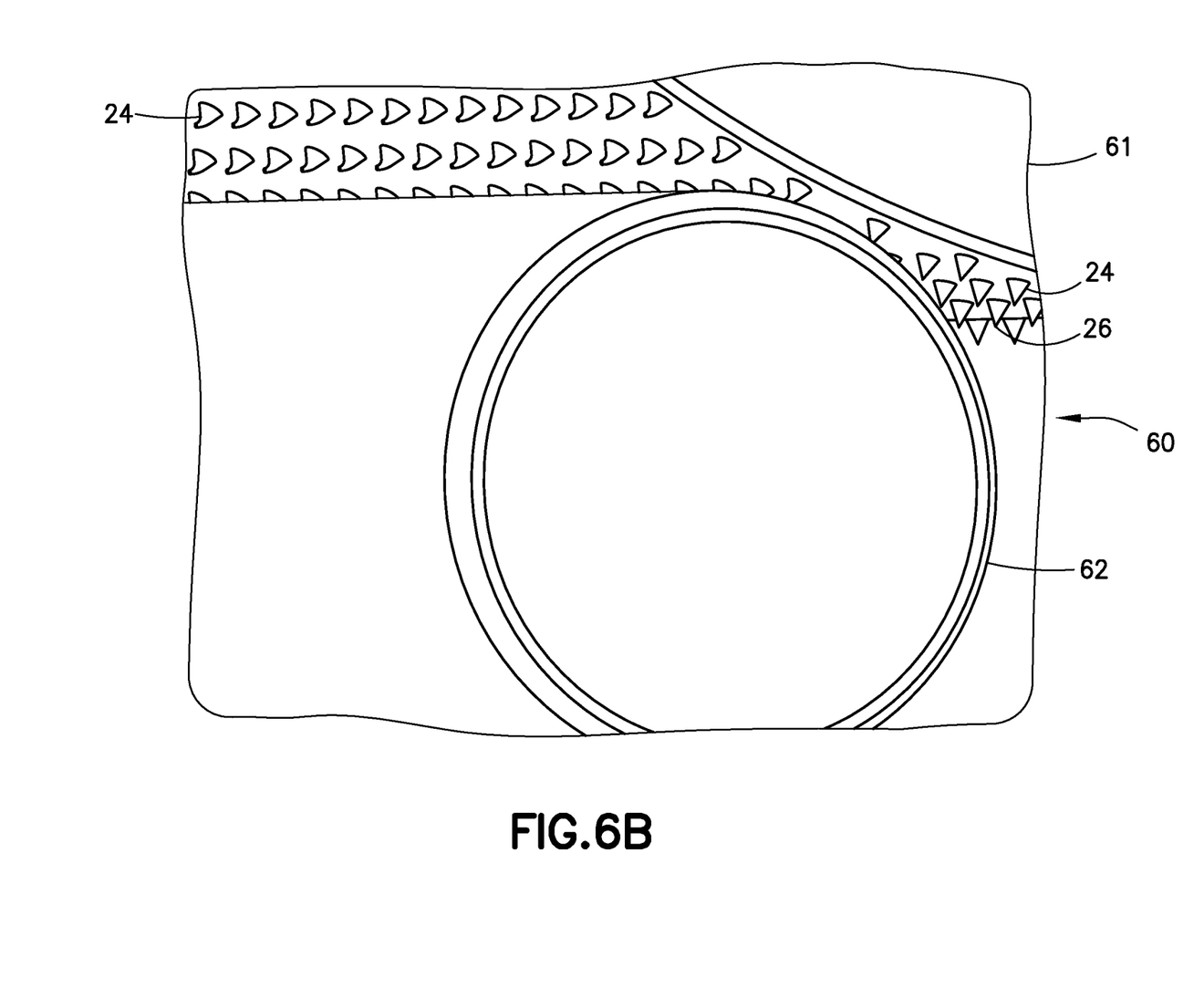
FIG. 6B shows spikes bent in an opposite direction than the spikes in FIG. 6A.

FIG. 6B shows an alternate embodiment where a spike bending roller 62b is provided in place of the non-rotatable curved support 62a of FIG. 6a. The spike bending roller 62b can be an idle roller (i.e. not driven rotatably) and can be formed from a hard rubber or other high friction material that will grip the spikes 24 and cause the spikes to bend in the upstream direction, as with the non-rotatable curved support 62a of FIG. 6a. However, the spike bending roller 62b can be driven rotatably and will cause the spikes 24 to bend in an upstream or downstream direction that is determined by the rotational speed of the spike bending roller 62b relative to the travel speed of the sheet 20 in the feed direction. More particularly, the spikes 24 will be bent in a downstream direction if the out surface of the spike bending roller 62b has a speed that exceeds the speed of the sheet 20. Additionally, plural spike bending rollers 62b can be provided substantially end-to-end in the width direction 34 and can be rotated at speeds that are controlled individually so that the bending direction and/or bending amounts of the spikes 24 will differ and different positions across the sheet 20 in the width direction 34

After sufficient curing of the resin, the sheet 20 can be wound for shipment to a warehouse location or an installation site. The sheet can be installed over a porous sheet so that the permanently curved spikes 24 engage securely in the pores of the porous sheet to prevent separation of the sheet 20 due to downward forces along a sloped landfill site and also due to wind-related forces.

Figure 9:
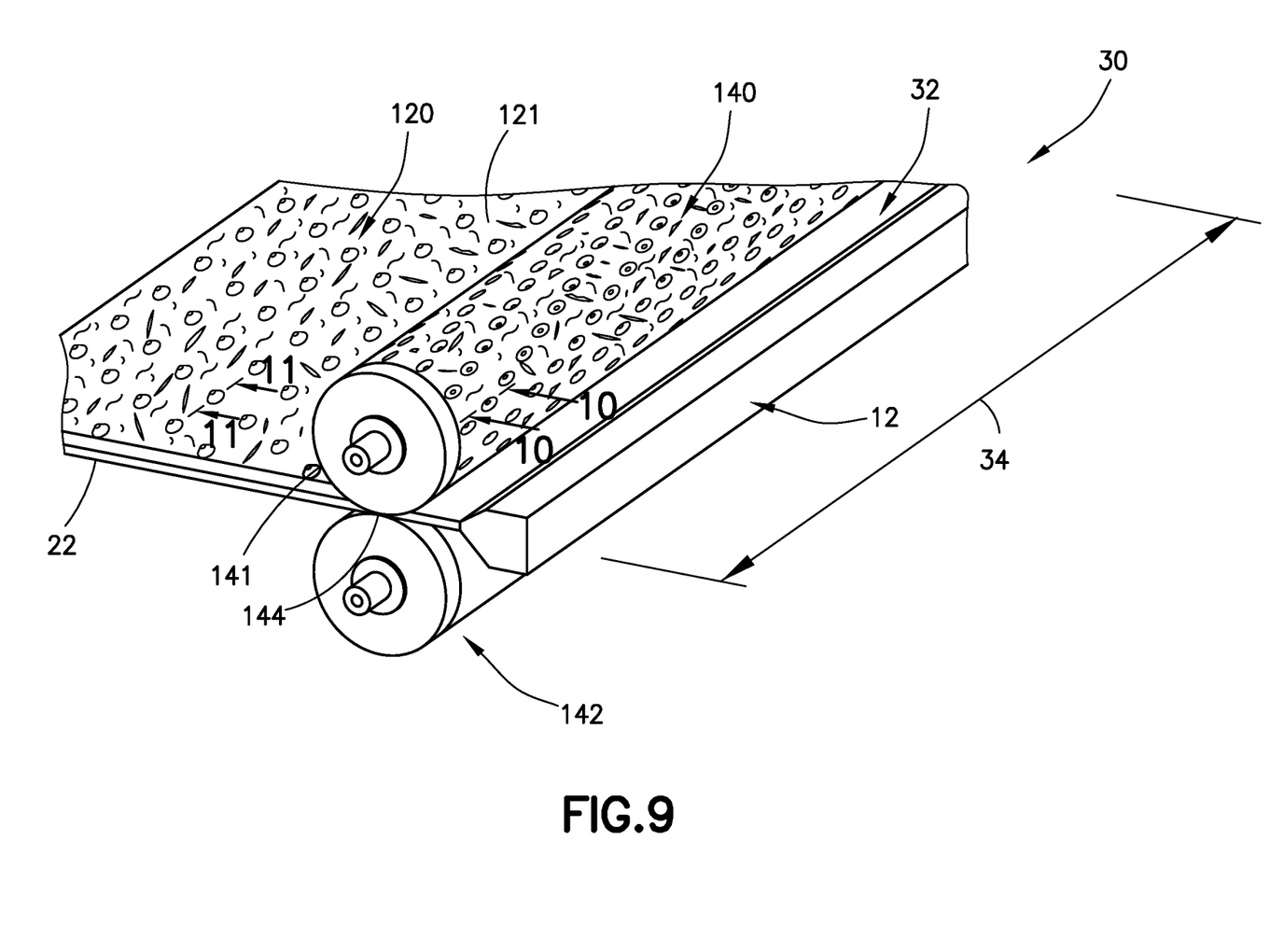
FIG. 9 is a perspective view similar to FIG. 2, but showing an alternate embodiment of the first chill roller.
Figure 10:
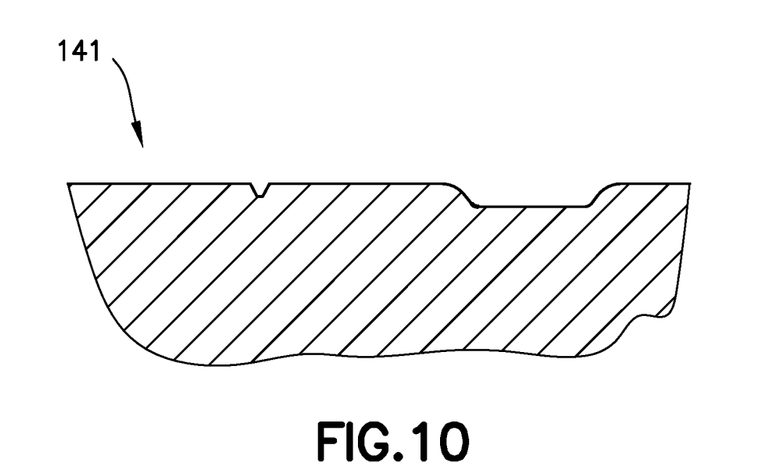
FIG. 10 is a cross-section taken along line 10-10 of FIG. 9.
Figure 11:
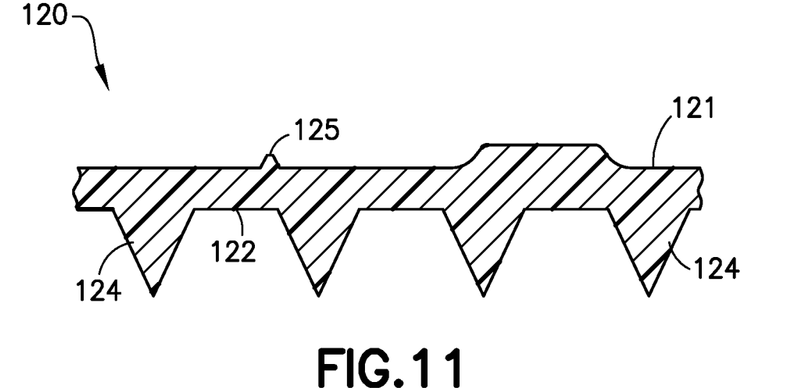
FIG. 11 is a cross-section taken along line 11-11 of FIG. 9.

FIGS. 9-11 illustrate an alternate embodiment where a spike forming station 140 includes a first chill roller 141 that has a non-smooth outer surface, at least at locations inwardly from opposite axial ends of the first chill roller 141. The non-smooth outer surface of the first chill roller 141 includes cavities 145 and 146, as illustrated in FIG. 10. The cavities 145 and 146 in the first chill roller 141 form projections 125, 126 in the first surface of the resin sheet 120. The projections 125 are illustrated as truncated cones, while the projections 126 are illustrated as short ridges. In the typical version of the second embodiment, the projecting distance of the spikes 124 from the second surface 122 of the resin sheet 120 will exceed the projecting distance of the projections 125, 126. For example, the spikes 124 of one embodiment will have a projecting distance prior to bending of about 0.225 inch with the spikes 124 being spaced from one another by about 1.0 inch, while the projections 125 will have a projecting distance of about 0.03 inch and a spacing between the projections being about 0.2 inch. The presence of the projections 125, 126 from the first surface 121 of the alternate resin sheet 120 will prevent direct application of forces across the entire width of the resin sheet 120 to be exerted by the rotatably driven roller 61 at the spike bending station 60. Accordingly, the rotatably driven roller 61 at the spike bending station 60 may be configured to apply pressure only to selected longitudinal regions across the width 34 of the sheet 120, such as width 34 regions adjacent the opposite lateral edges of the sheet 120 where there are no projections 125, 126. Alternatively, the spike bending station 60 may be provided without a rotatably driven roller 61. In this situation, the sheet rolling station 70 and/or the swivel arms 64 and the air cylinders 66 will be configured to maintain sufficient tension on the resin sheet 121 to ensure that the spikes 124 that move across the non-rotatable curved support 62 at the spike bending station 60 will be bent as described and illustrated above with respect to the first embodiment.

Figure 12:
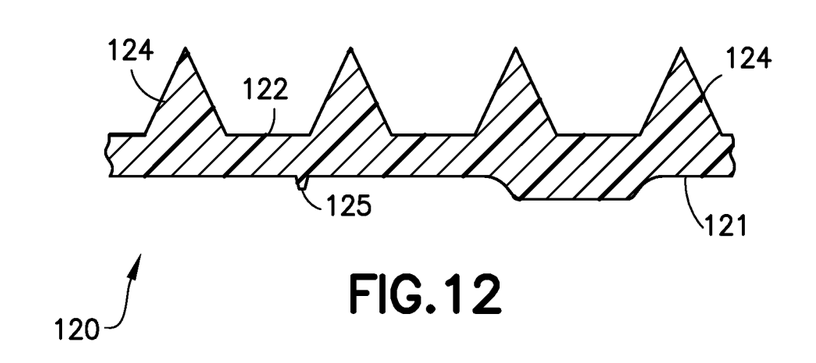
FIG. 12 is a cross-section similar to FIG. 11, but showing an inverted sheet and projections one surface that are less tapered taper.

The preceding illustrations show the spikes 24, 124 projecting downward. However, the gravitational orientation is not required, and the sheets can be inverted in many applications. For example, FIG. 12 shows the sheet 120 oriented with the spikes 124 projecting up and with a version of the truncated projections 125 projecting down. The projections 125 in FIG. 12 are less tapered than in FIG. 11 (e.g. 15° in FIG. 12 as compared to 30° in FIG. 11). The less tapered projections 126 of FIG. 12 are less likely to penetrate into an adjacent surface and will define a closed space adjacent the sheet 120 for methane gas collection. Trapped methane gas adjacent the sheet 120 can be collected by piping and valves systems and can lead to carbon credits for the operator of the landfill site at which the sheet 120 is employed.

While the invention has been described with respect to certain preferred embodiments, it is understood that the scope of the invention is not limited to these embodiments.

What is claimed is:

1. A system for a geomembrane, comprising:
   an extrusion station having a flat extrusion die for extruding a resin sheet having opposite first and second flat surfaces;
   a spike forming station having first and second chill rollers forming a nip therebetween and disposed so that the first chill roller rolls against the first surface of the sheet and the second chill roller rolls against the second surface of the sheet, the second chill roller having recesses formed therein, the recesses being configured to cause the resin at the second surface of the resin sheet to flow into the recesses and to form spikes on the first surface of the resin sheet as the resin sheet separates from the first and second chill rollers; and
   a spike bending station having a convexly curved support disposed for contacting the spikes and bending the spikes toward the spike forming station as the resin sheet moves away from the spike forming station.

2. The system of claim 1, wherein the spike bending station further includes a spike bending station roller engaging the first surface of the resin sheet at a position opposed to the non-rotating convexly curved support.

3. The system of claim 2, wherein the convexly curved support is a non-rotating convexly curved support.

4. The system of claim 3, wherein the non-rotating convexly curved support has at least one adjustable mount for moving the non-rotating convexly curved support selectively toward and away from the second surface of the resin sheet for controlling a pressure applied to the spikes by the non-rotating convexly curved support.

5. The system of claim 4, wherein the at least one adjustable mount comprises at least one air cylinder for moving the non-rotating convexly curved support selectively toward and away from the spike bending station roller.

6. The system of claim 5, wherein the non-rotating convexly curved support is mounted on a swivel arm that is mounted pivotally at a location spaced from the non-rotating convexly curved support.

7. The system of claim 2, wherein the convexly curved support comprises at least one spike bending roller.

8. The system of claim 7, wherein the at least one spike bending roller has a hard rubber outer layer with friction characteristics sufficient to grip the spikes.

9. The system of claim 7, wherein the at least one spike bending roller is rotatably driven by at least one variable speed rotational drive.

10. The system of claim 9, wherein the at least one spike bending roller comprises plural spike bending rollers axially aligned with one another, and the at least one variable speed rotational drive comprises plural variable speed rotational drives assigned respectively to the plural spike bending rollers so that the spike bending rollers are driven rotatably at selected respective rotational speeds.

11. A method for forming a geomembrane, comprising:
    extruding a resin sheet from a flat extrusion die so that the resin sheet has first and second opposite flat surfaces;
    feeding the resin sheet along a feeding direction through a nip between first and second chill rollers so that the first chill roller contacts the first surface of the resin sheet and so that the second chill roller contacts the second surface of the resin sheet, the second chill roller having recesses and the first and second chill rollers applying sufficient pressure to the resin sheet for causing the resin adjacent the second surface of the resin sheet to flow into the recesses;
    separating the resin sheet from the first and second chill rollers so that the resin separated from the recesses in the second chill roller forms spikes projecting from the second surface of the resin sheet; and
    causing projecting ends of the spikes that project from the second surface of the resin sheet to move against a convexly curved spike bending surface thereby causing the spikes to bend relative to the feeding direction of the resin sheet.

12. The method of claim 11, further comprising applying pressure to the first surface of the resin sheet at a position opposite the convexly curved spike bending surface.

13. The method of claim 12, further comprising moving the convexly curved spike bending surface toward or away from the second surface of the resin sheet for adjusting a pressure applied for bending the spikes.

14. The method of claim 13, wherein the convexly curved spike bending surface is non-rotatable.

15. The method of claim 13, wherein the convexly curved surface is a spike bending roller that is rotatable.

16. The method of claim 15, further comprising rotatably driving the spike bending roller by a variable speed drive device.

17. The method of claim 16, wherein the variable speed drive device drives the spike bending roller so that an outer surface of the spike bending roller moves faster than a feeding speed of the resin sheet along a feeding direction.

18. The method of claim 16, wherein the variable speed drive device drives the spike bending roller so that an outer surface of the spike bending roller moves slower than a feeding speed of the resin sheet along a feeding direction.

* * * * *